United States Patent Office 3,110,686
Patented Nov. 12, 1963

3,110,686
FOAMED ELASTOMERIC MATERIAL WHICH IS THE REACTION PRODUCT OF A LINEAR POLYCARBONATE, AN ORGANIC DIISOCYANATE AND WATER
Wilbert F. Newton, Pittsburgh, Pa., assignor, by mesne assignments, to Pittsburgh Plate Glass Company
No Drawing. Filed Dec. 16, 1954, Ser. No. 475,830
5 Claims. (Cl. 260—2.5)

The present invention relates to the provision of novel useful resilient, cellular synthetic foams. More particularly, it relates to resilient, cellular foams prepared by the reaction fo a linear polycarbonate and an organic diisocyanate under foam inducing conditions.

Resilient, cellular synthetic foams find wide utility, for example, as mattresses, pillows, chair pads, rug pads, etc. Although many different elastic cellular foams have been provided for such uses, heretofore certain reservations have been attached to their use, either because they are too costly or because their resiliency or other physical properties leave something to be desired. This applies both to synthetic foams as well as those prepared from natural rubbers.

According to the present invention, a resilient, cellular synthetic foam has been provided which has unusually desirable physical properties, particularly with respect to resiliency. In addition, these contemplated foams may be prepared from less expensive materials.

A further advantageous feature of the contemplated elastic synthetic cellular foams is their unique property of "slow return." That is, after being compressed and upon release of the compressing force, they slowly return to their original shape. This quality of "slow return" makes many of the contemplated foams particularly suitable for use in mattresses, seat cushions, pillows, etc. In crash pads, "slow return" is frequently quite critical, the protective quality of such pads depending not only on the compressibility and consequent absorption of the initial shock, but also the rate of expansion or return to original shape. Instantaneous or essentially instantaneous return to original shape is often detrimental. Consequently, a cellular foam having delayed or slow return is desirable.

By virtue of the present invention, a resilient, cellular foam is provided which possesses the advantageous property of "slow return." Thus, a resilient, cellular foam comprising the reaction product of a linear polycarbonate and an organic diisocyanate in which the foaming is induced by the presence of a small quantity of water, has been provided by the present invention. Such foam is soft to the touch, contains an essentially uniform cellular structure, is elastic and may possess the property of "slow return." They are quite strong withstanding substantial compression or tension without crumbling or otherwise disintegrating and are water insoluble. They possess good fire-resistance properties as well as substantial solvent resistance.

When prepared in accordance with a suitable technique, the cellular structure of the foam is essentially uniform comprising small communicating and/or non-communicating cells. As a consequence, the foams are not only elastic, but are absorptive, and when immersed in inert liquid media, will act as a sponge. They are relatively light, having a density of from 2 to 6 pounds per cubic foot. Under compression, a typical contemplated foam may be compressed to between one-twentieth and one-half its volume.

Foams having the afore-enumerated unique combination of properties including "slow return" are prepared by recourse to any of several procedures by which a linear polycarbonate is suitably reacted with an organic diisocyanate, such as 2,4-toluene diisocyanate, in the presence of a small amount of water which induces the foaming action. Apparently, during the course of the interreaction between the two organic components, the water or other foaming agent reacts with an isocyanate radical present evolving carbon dioxide, the foaming agent.

For the most part, the resilient and elastic property of the contemplated foams are achieved by effecting the desired reaction between the linear polycarbonate and the organic diisocyanate in the presence of a foam inducing agent in the substantial absence of agents or radicals such as cyclic or polycyclic structures which tend to provide rigidity. Thus, linear polycarbonates which are free from aromatic nuclei are preferred. Likewise, the absence of components such phthalic anhydride or the corresponding acid is recommended in this regard. Compounds which possess three or more reactive hydrogen such as the trihydric alcohols typified by glycerol and the tribasic acid esters such as citric acid esters should be excluded.

Of course, at the expense of resiliency, elasticity, and softness it is possible to incorporate minor quantities of these materials. However, usually not more than about 3 percent by weight of the polycarbonate and diisocyanate is employed in any event.

Linear polycarbonates having molecular weights ranging from between 800 and 5000, more notably between 1600 and 3000, hydroxyl numbers of from about 20 to about 100 and containing terminal hydroxyl groups to the essential exclusion of other terminal groups are employed. Such linear polycarbonates may be prepared in accordance with processes described in application Serial No. 441,927, filed July 7, 1954, now abandoned, and application Serial No. 441,928, filed July 7, 1954, now U.S. Patent 2,787,632, both of which are also assigned to the assignee of this application. Such polycarbonates have the following general structure:

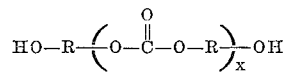

wherein R represents a residue of a saturated, acyclic, (aliphatic) diol and X designates the number of repeating units of the molecule. Depending on the particular diol from which R is derived, X may vary, but generally is a whole integer from 5 to 50. With diethylene glycol as the source of R, X is suitably from 12 to 20.

Also, linear polycarbonates such as those prepared by reaction of a saturated, acyclic diol and the dichloroformate of a different diol in accordance with Serial No. 441,927 are useful. Likewise, other mixed polycarbonates derived from two or more acyclic, saturated diols may be employed in accordance with the principles of the present invention.

Aromatic diisocyanates in which the diisocyanates are nuclear substituents such as 2,4-toluene diisocyanate and 2,6-toluene diisocyanate, and mixtures of the two comprise a favored class of diisocyanates in the performance of the present invention. Apparently, for the purposes of providing the herein contemplated foam, the aromatically substituted diisocyanates permit preparation of the foam with a minimum of difficulties. Other aromatic isocyanates include para-phenylene diisocyanate, 1,5-naphthalene diisocyanate, tolidine diisocyanate, 3,3¹-dimethyl, 4,4¹-biphenyl diisocyanate and 3,3¹-dimethoxy-4,4-biphenylene diisocyanate as well as corresponding diisocyanates in which the aromatic nucleus is further substituted with halogens, notably chlorine such as 2-chloro-paraphenylene diisocyanate and particularly lower alkyl groups containing usually up to 5 carbon atoms such as methyl, ethyl, isopropyl, butyl, etc. nuclear substituents. Inert nuclear substituents such as $NO_2$— may also be present. Other organic diisocyanates may be employed to provide foams.

In practice, the foam is generated according to one procedure by mixing a linear polycarbonate and appropriate organic diisocyanates, such as 2,4-toluene diisocyanate, and effecting some interreaction until a more viscous system results, e.g. until an extended polymer is formed. Depending to a great extent upon the reagents and their reactivity, this may take from several seconds to an hour, but ideally consumes several minutes under vigorous agitation. After the reaction medium, due to interreaction of the two reagents, is suitably viscous to entrap the foaming agent, a small quantity of water is added which by virtue of its reactivity with isocyanate groups present in the viscous medium liberates $CO_2$. Upon transferring to and standing in a suitable mold, foaming takes place with the observable rise occurring in a matter of from several seconds up to 10 minutes and a cellular foam is generated.

It is also possible to facilitate the foam manufacture by incorporating in the material mixture, a catalytic quantity of triethylamine or like amine containing no active amino hydrogen. Tertiary amines, including other trialkylamines, N-methyl morpholine, and pyridine may be used. Usually between 0.05 and 2.5 percent trimethylamine by weight of the linear polycarbonate suffices to impart the catalyzing effect. Somewhat larger concentrations of catalysts are possible, but care is usually exercised to avoid unduly rapid foaming.

It will be appreciated that the exact ratio of linear polycarbonate and organic isocyanate utilized in connection with the generation of the herein contemplated foams may be widely varied. If between 1 and 6 moles of organic diisocyanate per mole of linear polycarbonate is employed, high quality foams may be prepared. Using a somewhat more restricted quantity of organic isocyanates, such as between 1 to 3 moles thereof per mole of linear polycarbonate, provides the best foam.

For the most part, the described foaming procedure is accomplished without recourse to temperatures other than atmospheric. However, the overall foaming reaction apparently is exothermic and in large scale operation, it may be desirable to make provision for removing some of the generated heat and maintaining as nearly as possible, uniform temperatures throughout the foaming mixture. Temperatures as high as 100° C. may be tolerated.

Subsequent to generation, the foam may be further processed to enhance its properties or otherwise make it more suitable for commercial use. Thus, the foam may be post-cured by subjecting it to temperatures in the general range of 60° C. to 150° C. The foam may also be boiled in water.

In those procedures wherein the addition of water as a foam inducing agent is effected subsequent to the mixing of the entire quantity of isocyanate and linear polycarbonate, the respective reagents should, of course, be free from detectable traces of water to insure the absence of premature foaming, or interference with the initial reaction between the linear polycarbonate and organic isocyanate.

Other procedures for bringing the reagents into foam producing relationship are available. Thus, the linear polycarbonate and catalyst, if desired, along with a portion but not all of the organic diisocyanate, may be reacted to provide an intermediate linear reaction polymer which is more viscous than the initial mixture of reagents. Thereafter, additional isocyanate is added and with good agitation, foaming may be induced by incorporating a small quantity of water, or other foam inducing agent into the mixed media.

It is also possible to provide foams by adding an organic diisocyanate such as 2,4-toluene diisocyanate to a mixture containing the linear polycarbonate, the appropriate quantity of water, and when desired, the catalyst. In this procedure, violent agitation during and subsequent to the addition of the organic diisocyanate is quite important. Also, it has been found advisable to incorporate an emulsifier such as alkyl aryl polyether alcohols such as are sold under the trade name Triton X–100, polyoxyethylene sorbitan trioliate and the sodium salt of N-methyl-N-palmitoyl taurate to the mixture prior to adding of the isocyanate.

Water is the preferred foam inducing agent, and may be suitably introduced in various forms other than by mere addition of water. Steam, for example, may be admixed or passed into the reaction medium. Salts containing easily freed water of crystallization may be used to provide the water for inducing foam. Water solutions of glycols and alkylol amines, e.g. ethylene glycol, butylene glycol, 1,4-butane diol and mono-diethanolamine. Small amounts, usually from 0.05 to 5.0 percent of foam inducing agent or agents by weight of the reactants are used to impart the desired result.

Contemplated linear polycarbonates may be prepared by the following illustrative procedures:

PROCEDURE A

Into a suitable reaction, a mixture including an inert organic solvent such as ethylene dichloride, a bis-chloroformate of a diol, e.g. diethylene glycol, and a diol such as diethylene glycol are charged. Between 1.0 and 2.0 moles of bis-chloroformate per mole of glycol are employed. With temperatures of between 0° C. and 30° C., an aqueous solution of concentrated sodium hydroxide (e.g. 50 percent NaOH) is sprayed into the mixture, until a total of about 3 to 5 moles of NaOH per mole of bis-chloroformate is so added. Good agitation of the mixture accompanies the addition and is continued for some 2 to 3 hours thereafter.

The resulting system is phase separated and the organic layer, if necessary, may be filtered whereafter the inert solvent is removed by vacuum distillation at temperatures below 125° C. The heavies constitute the linear polycarbonate.

PROCEDURE B

Using a mixture of between 1.05 and 1.15 moles of an acyclic diol such as diethylene glycol per mole of a carbonate diester, e.g. diethyl carbonate, an ester interchange or alcoholysis type of reaction is conducted to provide a comtemplated linear polycarbonate. A catalyst, for example, metallic sodium in concentrations on the order of 0.005 percent by weight of the mixture is used.

The reaction is effected by applying heat, usually to gradually elevate the temperature up to as high as about 200° C. Throughout the reaction, the evolved ethyl alcohol is withdrawn from the system by gradual application of a vacuum thereto as the reaction progresses. The mole ratio of reactants is maintained essentially constant throughout by returning any reactants which may accompany the removed ethyl alcohol by selective condensation.

After concluding the reaction, the product containing reaction mixture is subjected to vacuum topping to remove unreacted reagents. Maximum temperatures between 150° C. and 200° C. are used in this step.

The following examples illustrate the preparation of elastic foams according to the principles of this invention.

*Example I*

Into a 150 milliliter glass beaker was charged 20 grams of a linear polycarbonate having a hydroxyl number of 71 prepared according to Procedure B using diethyl carbonate and diethylene glycol. After good mixing, 6.6 grams of 2,4-toluene diisocyanate were added with mixing for 15 minutes until the temperature was 42° C. following which 0.8 milliliter of water was added, stirring being continued until foaming commenced.

The foaming mixture was placed in a mold consisting of a small crystallizing dish 10 centimeters in diameter and at room temperature for one hour. The foam was thereafter dried for one hour by placing in an oven at 60° C. The foam rose 5.0 centimeters and had good elasticity, flame resistance, and "slow return," was acceptably strong, having good tensile strength, and had large cells.

*Example II*

Twenty grams of a linear polycarbonate having a hydroxyl number of 71 prepared by reacting diethylene glycol and diethyl carbonate according to Procedure B and 0.1 gram of triethylamine were mixed thoroughly in a glass beaker. Then 4.5 grams of 2,4-toluene diisocyanate was added, and mixing continued for 5 minutes until the reaction mixture reached 50° C. A second 4.5 gram portion of the diisocyanate was then added and mixed for 5 minutes.

1.9 milliliters of water were added, mixing continuing until foaming commenced whereafter the mixture was transferred to a 10 centimeter diameter crystallizing dish, serving as a mold. After standing at room temperature for several hours, the dish was placed in an oven at 60° C. for one hour to cure the foam. The foam rose 5.5 centimeters and was acceptably strong and resilient, showing "slow return."

*Example III*

Following the procedure of Example I, except that 1.9 milliliters of water were added, 0.03 gram of triethylamine was initially mixed with the linear polycarbonate and 9.0 grams of the diisocyanate were added, resulted in a strong, elastic foam having "slow return" which rose 5.5 centimeters in the mold.

*Example IV*

Following the procedure of Example I, but instead using 20.0 grams of a polycarbonate having an hydroxyl number of 71 prepared according to Procedure B using diethylene glycol and diethyl carbonate, and saturating 1.9 grams of water with triethylamine gave a suitable elastic foam which rose 4 centimeters in the mold. The foam in this case was cured in an oven at 60° C.

*Example V*

Employing the procedure and details of Example I with the exception that the linear polycarbonate had a hydroxyl number of 38, prepared according to Procedure B using diethyl carbonate and diethylene glycol, only 4.5 grams of 2,4-toluene diisocyanate were used, and 0.1 gram of triethylamine was initially admixed with the polycarbonate produced an elastic foam having small cells of good strength and elasticity. No curing step was used.

*Example VI*

Using the procedure of Example I, 22.6 grams of a linear polycarbonate, hydroxyl number 61.5, prepared according to Procedure B using diethyl carbonate and triethylene glycol was admixed first with 0.1 gram of triethylamine, then with 9.0 grams of 2,4-toluene diisocyanate and 1.9 grams of water. The foam resulting therefrom rose 6 centimeters in the mold, and had good strength and elasticity as well as evidencing "slow return."

*Example VII*

Using the procedure of Example I, an elastic, strong foam was produced by employing 18.4 grams of linear polycarbonate (hydroxyl number 76.5) prepared by Procedure B from diethyl carbonate and equimolecular quantities of diethylene glycol and triethylene glycol, 9.0 grams of 1,4-toluene diisocyanate, 1.9 grams of water and 0.05 gram of triethylamine. The foam rose 5.0 centimeters in the mold.

*Example VIII*

An elastic foam of good strength having the property of slow return was prepared following the procedure of Example I from 17.4 grams of a linear polycarbonate, hydroxyl number 42, prepared by Procedure B from diethyl carbonate and dipropylene glycol. In this example, 0.1 gram of triethylamine was mixed with the linear polycarbonate and only 4.5 grams of 2,4-toluene diisocyanate was used. Curing of the foam was effected by placing the mold in an oven at 110° C. for one hour.

*Example IX*

In this foaming operation, the procedure of Example I was followed using 25.5 grams of a linear polycarbonate (hydroxyl number 55) prepared by Procedure A from diethylene glycol and the bis-chloroformate of diethylene glycol. 0.1 gram of triethylamine was included therewith, and 9.0 grams of 2,4-toluene diisocyanate and 1.9 grams of water were used. The foam was cured at 100° C. for an hour, and rose 9.5 centimeters.

*Eample X*

Following the procedure of Example I, an elastic, strong foam was prepared from 20.0 grams of a polycarbonate (hydroxyl number 37) made according to Procedure A from diethylene glycol and the bis-chloroformate of diethylene glycol, 5.2 grams of 2,4-toluene diisocyanate and 1.1 grams of water. With the polycarbonate was mixed 0.1 gram of triethylamine. The foam rose 5.0 centimeters in the mold.

*Example XI*

With the procedure of Example I, 21.9 grams of a linear polycarbonate (hydroxyl number 64) made according to Procedure A from diethylene glycol and the bis-chloroformate of diethylene glycol, 9.0 grams of 2,4-toluene diisocyanate and 1.9 grams of water gave a strong, elastic foam which rose 6.0 centimeters in the mold. 0.1 gram of triethylamine was initially mixed with the polycarbonate. Curing was effected by placing in an oven at 100° C. for two hours.

*Example XII*

Employing the procedure of Example I, a foam was produced from 20.0 grams of a linear polycarbonate (hydroxyl number 36.5) prepared according to Procedure A from the bis-chloroformate of diethylene glycol and triethylene glycol, 0.1 gram of triethylamine, 7.3 grams of 2,4-toluene diisocyanate and 0.9 gram of water. Curing was conducted at 100° C. for one hour. The foam rose 6.0 centimeters in the mold and was strong and elastic.

*Example XIII*

A series of foams were prepared by mixing 100 grams of the linear polycarbonate indicated in the following table, an emulsifier sold by the Emcol Corporation, of Chicago, Illinois, under the trade name Emcol H-77 in the listed quantities, 1.0 gram of N-methyl morpholine and water in the quantities indicated in the table. To this, an isomeric mixture of toluene diisocyanates (70 percent 2,4-toluene diisocyanate and 30 percent 2,6-toluene diisocyanate), in the given quantities was added and stirred for from 20 to 60 seconds with a small Lightning Mixer having a 2 inch propeller, as listed below.

The stirred mixture was transferred to a dish 12 centimeters in diameter and allowed to rise and gel at room temperature. The foam was then cured in an oven at 110° C. for 30 minutes.

The following table summarizes the data:

TABLE I

| Polycarbonate | | | Isocyanate (grams) | Emulsifier (grams) | Water (grams) | Stirring Period (seconds) | Foam | |
|---|---|---|---|---|---|---|---|---|
| Type | Hydroxyl No. | Viscosity Poises Brookfield @ 23.5° C. | | | | | Density, pounds/ft.³ | Rise (centimeters) |
| Reaction of triethylene glycol chloroformate and triethylene glycol by Procedure A | 33.5 | 1,026 | 25.0 | 1.0 | 2.3 | 60 | 5-6 | 5.5 |
| Do | 42.0 | 33.5 | 20.0 | 1.0 | 1.3 | 45 | 5-6 | 4.5 |
| Reaction of diethylene glycol chloroformate and triethylene glycol by Procedure A | 37.5 | 2,470 | 20.0 | 1.0 | 1.3 | 45 | 5-6 | 5.5 |
| Do | 37.5 | 2,470 | 25.0 | 0.5 | 1.0 | 60 | 5-6 | 5.0 |
| Reaction of diethylene glycol and diethyl carbonate by Procedure B | 38.0 | 10,100 | 25.0 | 1.0 | 1.3 | 60 | 5-6 | 5.0 |

*Example XIV*

Using the procedure of Example XIII, elastic foams were prepared from 100 grams of a linear polycarbonate having a viscosity of 376 poises (Brookfield) at 23.5° C. and a hydroxyl number of 62.5, 1.0 gram of N-methyl morpholine, 1.0 gram of Emcol H-77 and 2.3 grams of water. The polycarbonate was prepared from diethyl carbonate and triethylene glycol by Procedure B. Varying quantities of an isomeric mixture of 70 percent 2,4-toluene diisocyanate and 30 percent of 2,6-toluene diisocyanate were employed. Stirring was for 20 seconds. The data is as follows:

| Experiment | Diisocyanate (grams) | Foam | |
|---|---|---|---|
| | | Density (pounds/ft.³) | Rise (centimeters) |
| 1 | 25.0 | 4.4 | 7.5 |
| 2 | 30.0 | 3.7 | 9.5 |
| 3 | 35.0 | 3.7 | 10.5 |

Although the present invention has been described with reference to the specific details of certain embodiments, it is not intended that it be construed as limited thereto, except insofar as is enumerated in the appended claims.

I claim:

1. An elastic, cellular foam comprising the reaction product obtained by reacting in the presence of water from 1 to 6 moles of an organic diisocyanate with one mole of a linear polycarbonate having a molecular weight between 800 and 5000, a hydroxyl number of from 20 to 100 and of the formula:

$$HO-R\left(O-\overset{O}{\underset{\|}{C}}-O-R\right)_x OH$$

wherein R represents a residue of a glycol from which both hydroxyls have been removed, and X designates a value of from 5 to 50.

2. An elastic cellular foam comprising the reaction product obtained by reacting in the presence of water from 1 to 6 moles of an aromatic diisocyanate with one mole of a linear polycarbonate having a molecular weight between 800 and 5000, a hydroxyl number of from 20 to 100 and of the formula:

$$HO-R\left(O-\overset{O}{\underset{\|}{C}}-O-R\right)_x OH$$

wherein R represents a residue of a glycol from which both hydroxyls have been removed, and X designates a value of from 5 to 50.

3. An elastic, cellular foam having a density of 2 to 6 pounds per cubic foot and comprising the reaction product obtained by reacting in the presence of water from 1 to 6 moles of an aromatic diisocyanate with one mole of a linear polycarbonate having a molecular weight of 800 to 5000, a hydroxyl number of 20 to 100 and of the formula:

$$HO-R\left(O-\overset{O}{\underset{\|}{C}}-O-R\right)_x OH$$

wherein R represents a residue of a glycol from which both hydroxyls have been removed, and X designates a value of from 5 to 50.

4. A slow-return elastic, cellular foam having a density of 2 to 6 pounds per cubic foot and comprising the reaction product obtained by reacting in the presence of water from 1 to 6 moles of toluene diisocyanate with one mole of a linear polycarbonate having a molecular weight of between 800 and 5000 and a hydroxyl number of 20 to 100 of the formula:

$$HO-R\left(O-\overset{O}{\underset{\|}{C}}-O-R\right)_x OH$$

wherein R represents a residue of a glycol from which both hydroxyls have been removed and X designates a value from 5 to 50.

5. A foamed, elastomeric material formed by reacting a linear polycarbonate with an organic diisocyanate in the presence of water, said linear polycarbonate having a hydroxyl number from 20 to about 100 and being the reaction product of diethylene glycol and a dialkyl carbonate.

References Cited in the file of this patent

UNITED STATES PATENTS

| 2,577,279 | Simon et al. | Dec. 4, 1951 |
| 2,621,166 | Schmidt et al. | Dec. 9, 1952 |
| 2,729,618 | Muller et al. | Jan. 3, 1956 |

FOREIGN PATENTS

| 650,002 | Great Britain | Feb. 7, 1951 |

OTHER REFERENCES

Heiss et al.: "Industrial and Engineering Chemistry," July 1954, volume 46, No. 7, pages 1498-1499.